3,268,706
INTERNAL CONE ARC TORCH
Lindon Cyril Laming, Redhill, Surrey, Kenneth Stevens, Richmond, Surrey, and Alan Ernest Stevens, Stoneleigh, Ewell, Surrey, England, assignors to Foster Wheeler Corporation, New York, N.Y., a corporation of New York
Filed Nov. 29, 1963, Ser. No. 326,990
4 Claims. (Cl. 219—123)

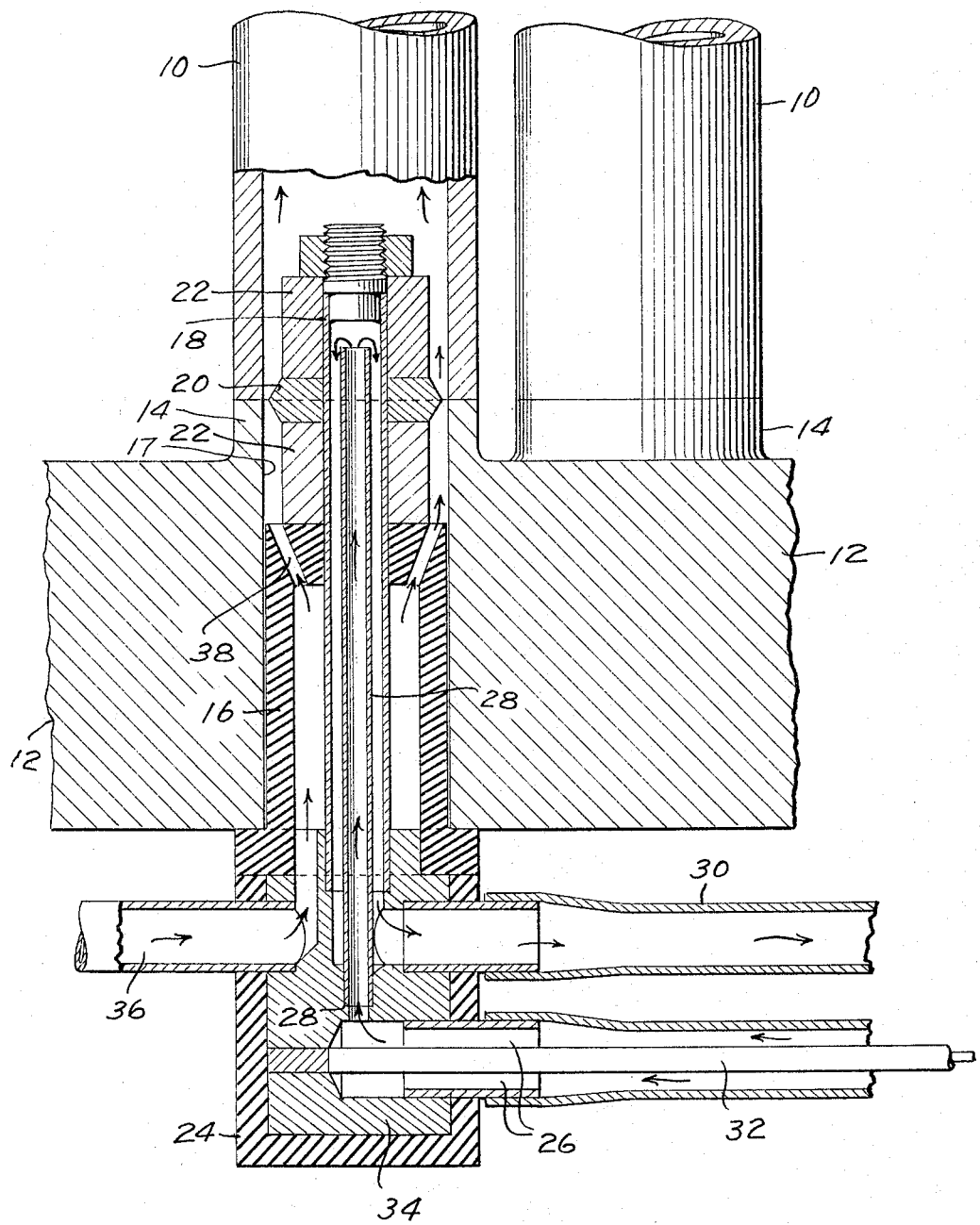

This invention relates to the welding of tubes to tube plates and headers from the inside of the tubes. In accordance with the invention the welding is effected by means of a torch which may be inserted into the bore of the tube and which has no moving parts. The electrode is in the form of a disc having its axis parallel to that of the tube and which is sandwiched between two magnets. The torch is located so that the electrode is at the level of the junction between the tube and the tube plate or header and the welding is effected by supplying current to the electrode so that an arc is struck between the electrode and the junction at which the weld is to be made. Because of the magnetic field provided by the magnets the arc travels around the electrode at high speed effecting the weld very rapidly.

It is highly desirable that the weld be protected against oxidation and therefore the arc is preferably shielded by means of an inert gas such as argon which can be led to the vicinity of the weld through passages in the body of the welding torch. In order that the shielding gas should not travel across the path of the arc at high speed it is best to arrange for the argon to be supplied to the space between the torch and the tube either at a point beyond the electrode or simultaneously at points on the near and far sides of the electrode.

In the course of the welding a large amount of heat is developed and it is essential that the temperature of the electrode be kept below that at which it will become damaged. This can be effected by cooling it with a liquid such as water which can be caused to circulate through passages in the body of the welding torch. It is also advisable for the dissipation of heat that the electrode be carried by a metallic member of substantial mass and of a material of high thermal conductivity such as copper.

An example of a welding torch in accordance with the invention is shown in the accompanying drawing which also illustrates the manner in which the torch is used.

The drawing shows a tube 10 being butt welded to a tube plate 12, the latter being formed in the vicinity of the weld with a stub tube 14.

The torch comprises a barrel 16 of insulating material dimensioned to obtain a reasonably good fit within the hole 17 in the tube plate. Within and projecting from this barrel there is a tube 18 which at the upper end carries an electrode 20 and a pair of magnets 22 on opposite sides of the electrode. The electrode is in the shape of a disc, the periphery of which is bevelled. The dimensions of the magnets 22 and barrel 16 are adjusted so that the annular tip of the bevelled surface is located opposite the junction between the tube 10 and the stub 14 where the weld is to be made. At the other end, the barrel 16 is attached to a casing of insulating material 24. This casing provides an inlet 26 for cooling water which, when admitted to the casing, travels up through a tube 28 within the tube 18 to the vicinity of the electrode and then down through the space between the two tubes and out of the casing through an outlet 30. The welding current is supplied through a conductor 32 which passes through the water inlet 26 and carries current to the electrode through a block 34 within the casing and the tube 18. The casing also has an inlet 36 for an inert shielding gas which passes to the vicinity of the electrode through the space within the barrel 16 and passages 38 in the head of the barrel.

It will be appreciated that the torch is made up entirely of stationary parts. To effect a weld it is only necessary to insert the torch into the bores in the tube and tube plate as shown so that the electrode is at the desired level and to switch on the current. The arc struck between the electrode and the tube courses rapidly around the axis of the torch and effects the weld very rapidly. The rapidity with which the weld is effected is of great importance because it ensures against the possibility of the cracking and distortion of the weld metal which are likely to take place if, as is usually the case, there is provided an electrode which is rotated within the tube to cause the arc to travel around the axis of the tube.

As already mentioned there can be an advantage in ensuring that the shielding gas does not pass through the arc at high speed. This can be done by restricting the space above the electrode through which the gas is to pass or by leading the gas to the vicinity of the weld through a tube which passes upwards through the barrel 16 and has an outlet above the level of the electrode. If desired the latter expedient can be adopted in addition to providing for upward flow as shown in the drawing.

As shown in the drawing there will be some dissipation of heat from the electrode through the tube 18 as well as that effected by the cooling water. The heat dissipation can be enhanced by increasing the mass of the tube 18 and making it of a material of high thermal conductivity such as copper.

The barrel 16 must, of course, fit the tube and the tube plate. It is made detachable from the casing 24 so that it and the electrode, its magnets and supporting tube can be replaced by another assembly having a barrel of a diameter appropriate to that of the tube being welded. The electrode must, of course, be fairly accurately aligned with the junction of the tubes to be welded and this can be done by the use of washers or shims for rounding the barrel and resting on the flange provided at the lower end of the latter.

Many variations, within the scope and spirit of the claims, will be apparent to those skilled in the art.

What is claimed is:
1. A welding torch for internal welding of tubes to a tube plate comprising
  an elongated barrel having a longitudinal axis adapted to be inserted within a hole of the tube plate,
  an electrode in the form of a disc,
  magnets disposed on opposite sides of the electrode,
  means connecting the electrode and magnets to the barrel so that the axis of the electrode is parallel to the axis of the barrel and the electrode is sandwiched axially between the magnets,
  means for positioning the barrel within the tube plate so that the electrode is at the level of the junction between the tube and the tube plate,
  and means for supplying current to the electrode so that an arc is struck between the electrode and the junction at which the weld is to be made,
  the magnets providing a magnetic field by which the arc travels around the electrode at a high speed.

2. A welding torch for internal welding of tubes to a tube plate comprising
  an elongated barrel having a longitudinal axis adapted to be inserted within a hole of the tube plate,
  an elongated tubular member extending axially from the barrel, an electrode in the form of an annular disc, cylindrical magnets disposed on opposite sides of the electrode, means affixing the electrode and magnets to the tubular member encircling the tubular member so that the electrode is sandwiched between the magnets, means for positioning the barrel within the tube plate so that the electrode is at the level of the junction between the tube and the tube plate, means for supplying current to the electrode so that an arc is struck between the electrode and the junction at which the weld is to be made, the magnets providing a magnetic field by which the arc travels around the electrode at a high speed, and means including a second tubular member within and co-axial with said first mentioned tubular member by which a cooling fluid is admitted in the torch to the vicinity of the electrode.

3. A welding torch for internal welding of tubes to a tube plate comprising an elongated cylindrical barrel having a longitudinal axis adapted to be inserted within a hole of the tube plate, an elongated tubular member extending co-axially through and from the barrel, the tubular member and barrel defining an annular space therebetween, a second tubular member co-axial and within but spaced from the first mentioned tubular member, an electrode in the form of an annular disc, a pair of cylindrical magnets, means positioning said electrode and magnets co-axially on the first mentioned tubular member so that the electrode is sandwiched between said magnets and so that the electrode is at the level of the junction between the tube and the tube plate when the barrel is positioned within the tube plate, means for admitting a cooling fluid to one of said tubular members, the tubular members being in communication in the vicinity of the electrode, whereby cooling fluid is circulated in the vicinity of the electrode, means for admitting a shielding gas in the annular space between the barrel and first mentioned tubular member, apertures in the barrel whereby said shielding gas is discharged towards the junction between the tube and tube plate where the weld is to be made, and means for supplying a current to the electrode so that an arc is struck between the electrode and said junction, the magnets providing a magnetic field by which the arc travels around the electrode at a high speed.

4. A welding torch according to claim 3 wherein said electrode is provided with a peripheral point defined by annular bevelled surfaces of the electrode.

References Cited by the Examiner

UNITED STATES PATENTS

| | | | |
|---|---|---|---|
| 2,743,342 | 4/1956 | Bettis et al. | 219—123 |
| 3,211,886 | 10/1965 | Barkan et al. | 219—123 |

JOSEPH V. TRUHE, *Primary Examiner.*